May 31, 1966 J. H. WALLY, JR 3,253,502
PHOTOREPRODUCTION DEVICES
Filed April 1, 1963 6 Sheets-Sheet 1

INVENTOR
JOSEPH H. WALLY Jr.
BY Brown, Jackson,
Boettcher & Dienner
ATTORNEYS

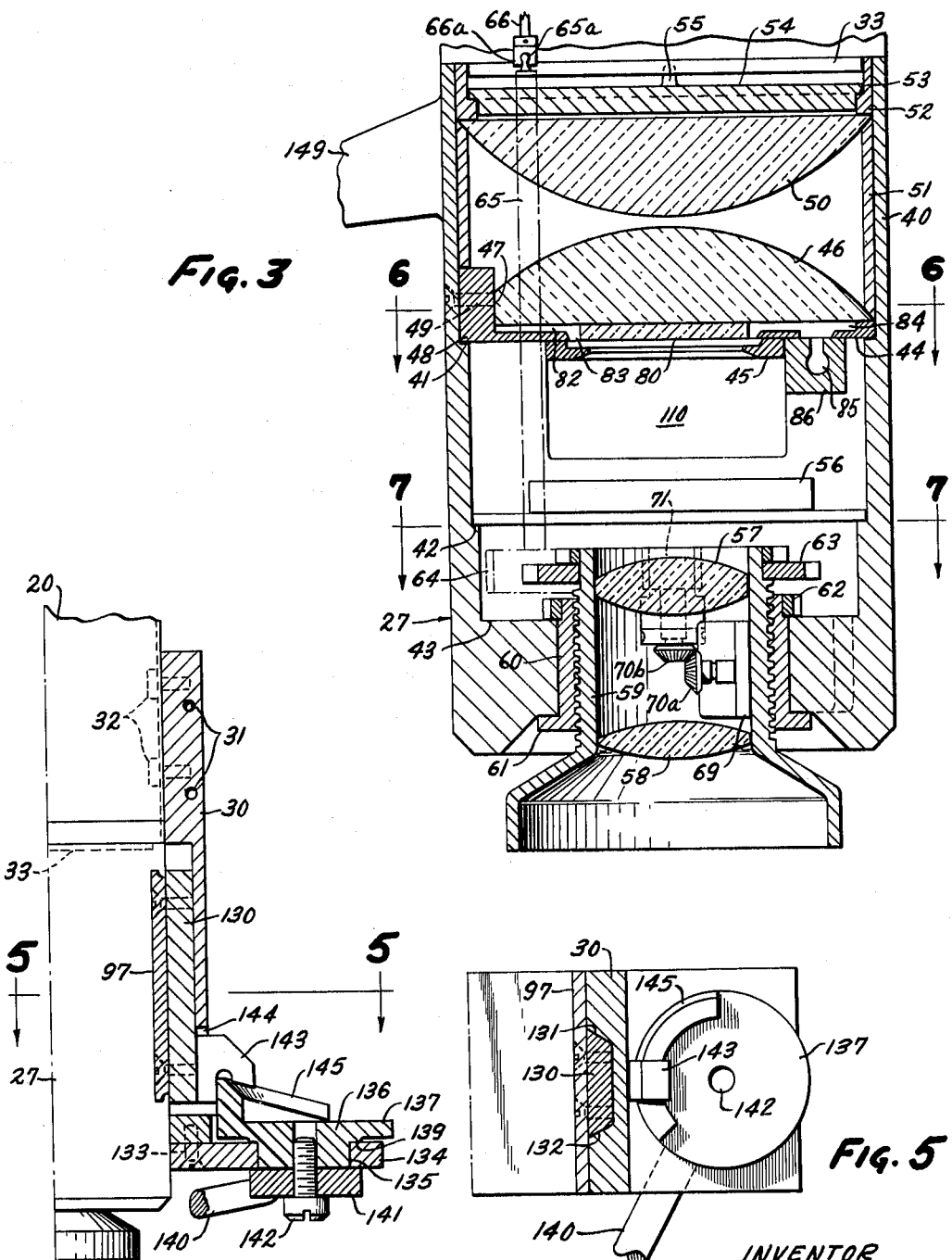

INVENTOR
JOSEPH H. WALLY Jr.
BY Brown, Jackson,
Boettcher & Dienner
ATTORNEYS

INVENTOR
JOSEPH H. WALLY Jr.
BY Brown, Jackson,
Boettcher, & Dienner
ATTORNEYS

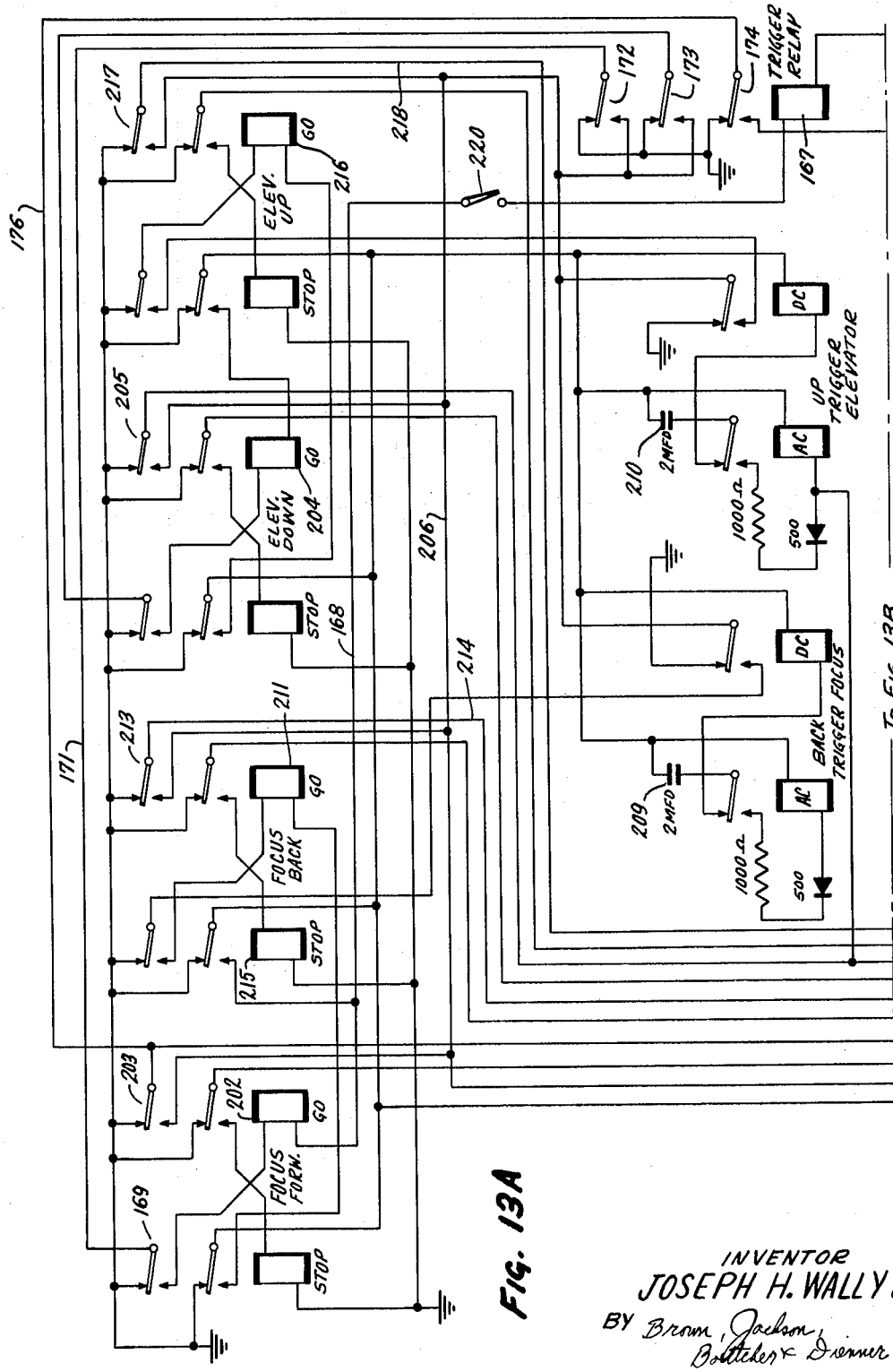

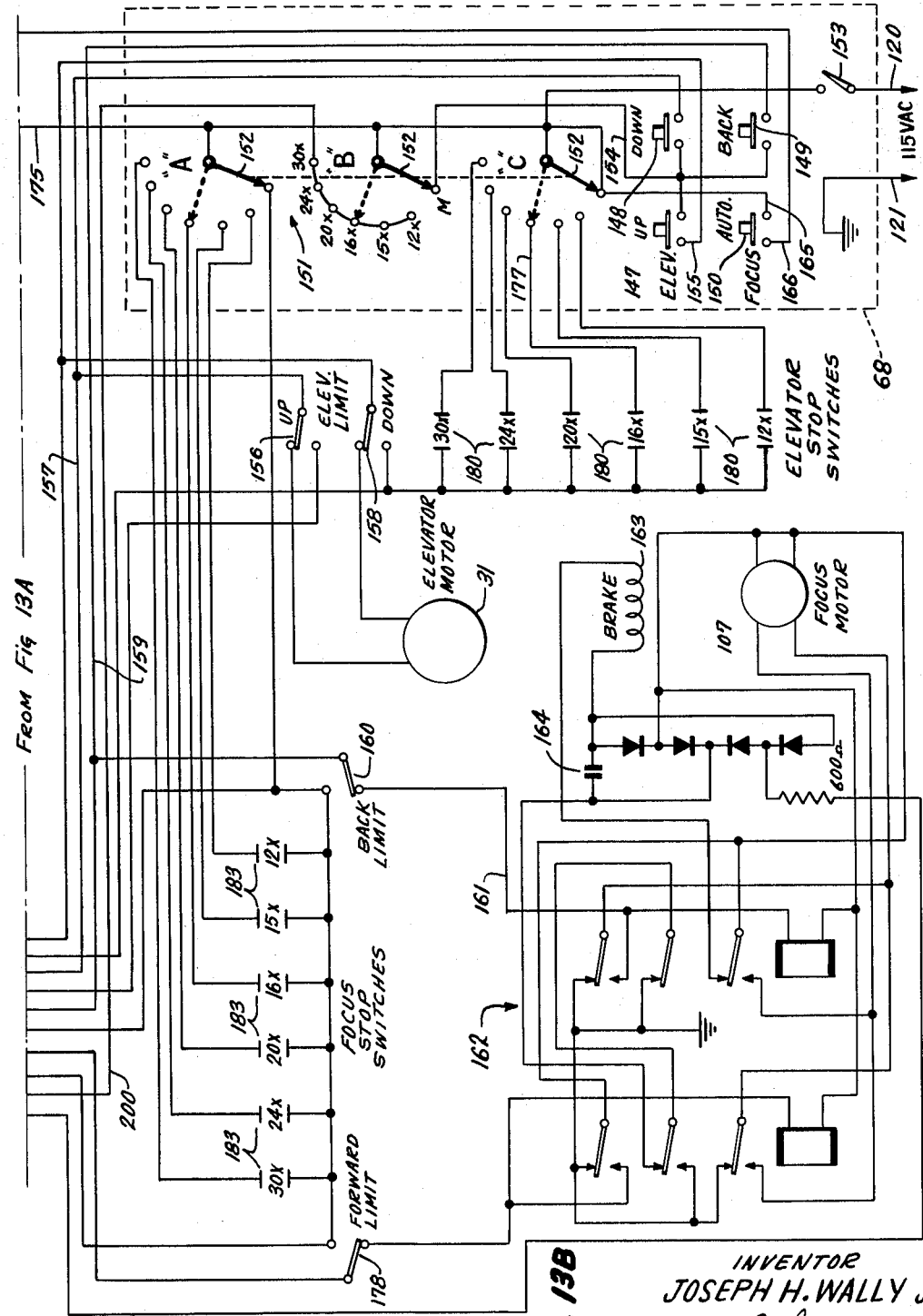

United States Patent Office 3,253,502
Patented May 31, 1966

3,253,502
PHOTOREPRODUCTION DEVICES
Joseph H. Wally, Jr., Shawnee Mission, Kans., assignor to Western Blue Print Company, Kansas City, Mo., a corporation of Missouri
Filed Apr. 1, 1963, Ser. No. 269,541
4 Claims. (Cl. 88—24)

This application is a continuation-in-part of my copending application Serial No. 156,065, filed November 30, 1961, now U.S. Patent No. 3,186,297, issued June 1, 1965.

This invention relates generally to photoreproduction devices and more particularly to such devices which have their principal use in microfilm photography either as a camera to produce an image in light sensitive film or to project an image of a thus previously produced image in film onto an easel as in viewing, printing and like photographic processes.

Specifically the invention relates to novel and improved focusing means for microfilm cameras, projectors and like photoreproductive devices as for example described and referred to in my above copending application Serial No. 156,065.

A first and principal object of the present invention is to provide a photoreproduction device, and more particularly one of the microfilm type, with means whereby its optical head may be automatically positioned to one of several precalibrated reduction or magnification stops.

An equally important and corollary object of the invention is to also provide such a photoreproduction device with further means by which its objective lens is automatically adjusted for accurate focusing at each of said reduction or magnification stops.

Another important object of the invention is to provide a photoreproduction device with focusing means which may be selectively positioned automatically to one of several precalibrated reduction-magnification stops or manually positioned to provide a specific magnification-reduction ratio within a given range, as for example, the maximum and minimum diameters determined by the automatic stops.

Another object of the invention is to provide digital counters coupled to either and usefully to both the objective lens focusing means and the elevating means which is used to raise and lower the optical head to obtain a new magnification or reduction diameter.

Thus a feature of the invention is that a visual check may be had on the magnification or reduction setting of such devices as well as a check on the focusing of the objective lens for each setting.

In the past attempts have been made to exercise control over the objective lens focusing means as the camera head was raised and lowered to different reduction settings by means of complex linkages which involved the use of cams and followers. However the relative short distances through which the objective lens moves in relation to the movements of the optical head introduced tolerance requirements which were difficult to maintain. Not only were there manufacturing and assembling problems in producing mechanical linkages which would accurately reproduce the related movements, but the components were subject to binding and wear as well as to expansion and contraction of parts. The result was that the linkage movements were not consistent and they would not return the objective to the same spacing from the film holder or image plane each time the height of the camera or optical head was adjusted as to change the reduction diameter setting. This introduced many problems of resolution and image reproduction.

In accordance with the invention these disadvantages are overcome and numerous advantages and features obtained by employing separate means such as reversible motors, one to elevate the optical head and the other to adjust the spacing of the objective lens relative to the film. These motors may be operated independent of each other when the device is set on manual so that an infinite number of enlargement or reduction diameters within the limits of the device may be obtained and also proper focus for each of said diameters.

In accordance with the invention, these adjustments may also be obtained automatically for a limited number of precalibrated enlargement or reduction stops and for each of which stops, the objective lens is also automatically focused. To this end, the invention provides a number of switches on the column which supports the optical head. These switches are selectively activated and are scanned by the optical head as it is moved vertically along its supporting column so as to interrupt the motor circuit as the activated switch is sensed.

Focusing is also obtained automatically by providing a second set of switches located to be scanned by a traveler which moves with the adjustment of the objective lens toward and away from the film. By appropriately locating these second switches and selectively actuating one, the motor driving the objective lens can also be stopped when the objective lens is at a distance from the film which gives satisfactory focus for the particular reduction or enlargement stop.

In accordance with the invention digital counters are associated with the two motors to provide a visual check of the spacing of the objective from the film and the film from the easel which is useful when the device is set for manual operation. For this reason, the invention further provides that when set for automatic focusing, the focus motor when initiated will first drive the objective lens to its lowest limit. At this time a relay circuit will be energized to reverse the motor and will adjust the objective back toward the film until the traveler finds an activated switch. The focus motor thereupon stops and so sets the focus. Similarly, the initial pulse which starts the scanning operation to find the selected stop for the optical head as well as focus position of the objective lens, will also start the optical head elevator first in a downward direction until it reaches its lower limit where it energizes a relay circuit reversing the motor, causing the elevator to rise until it is stopped on sensing an activated switch. Because the objective and optical head elevator are therefore always initiated in the same direction and so that the scanning of the switches is always effective only from the one side, the veracity of the digital counter readings is assured.

Because both focus adjustment and elevator adjustment are obtained by separate driving motors, each under the control of its own group of selectively activated switches which it scans, many important features and/or advantages are obtained.

Among these are first, that by electing to activate no switch, the focusing and enlargement or reduction diameter settings can be operated entirely independently of each other.

Also, when the device is in automatic, the objective lens will come to rest at the same distance from the film each time the photoreproduction device is set for a specific reduction or enlargement diameter. Thus focusing for the several enlargement or reduction stops can be achieved with extreme accuracy.

In this connection, a further feature of the invention is the provision of a brake in association with the focus motor shaft which energizes as the motor turns off and vice versa so that there is minimum overrun as the traveler reaches an activated switch and stopping of the objective lens is almost instantaneous.

A further feature of the invention which is obtained by the use of separate motors and stop switch controls, is that the precalibrated enlargement or reduction stops are independent of the distances which separate the switches, i.e., they do not have to be arranged in equal increments or in any special relation. Neither is it of any significance that the elevator has to move through a considerably longer path than does the drive means for the objective lens in the focusing operation. Both motors continue to run, once started, until they sense the particular switch of the group which they are scanning is activated, and in the usual instance, the focusing motor will find its position first and will be stopped before the enlargement or reduction diameter setting has been achieved. This represents a further convenience as well as simplification in operation. For example, in loading and unloading the film, one may set the device on manual and lower the head to a conveniently reached height. Then after changing the film, he has merely to reset the device on automatic for the reduction stop required. Conversely when working on the easel, it may be desired to raise the head out of the way. This also can be obtained manually and again can be reset to automatic with no complications. Each time, both the objective lens and the optical head elevator will be first brought to their "down" position from wherever they are found. This clears the digital counters. This being obtained then automatically both rise scanning their switches until they find the one selected for the reduction or enlargement diameter desired.

Many other objects, features and advantages of the invention will be at once apparent or will become so from the detailed description of a preferred embodiment of the invention which now follows. It will be understood, of course, in said description that the same is not to be taken in a limiting sense but merely as illustrative of the invention and that many changes, alterations, modifications and/or rearrangements of parts will be suggested therefrom and are to be considered as coming within the spirit of the invention, the scope of the said invention being defined by the appended claims and which are to be construed as broadly as permitted by the prior art.

Now referring to the drawings:

FIGURE 3 is a vertical sectional view taken through the optical compartment which is removably mounted beneath the lamp housing, the view illustrating the arrangement of the component parts of said optical compartment;

FIGURE 4 is a fragmented partly sectioned view and illustrates the optical compartment assembled with the lamp housing and the camming arrangement for locking it in said relation with the lamp housing;

FIGURE 5 is a view taken along lines 5—5 of FIGURE 4 looking in the direction of the arrows to show further details of the locking arrangement;

FIGURE 13 is in two sections designated as FIGURE 13a and FIGURE 13b and comprises a schematic view of the components and their associated electric circuits which comprise the illustrated embodiment of the invention.

Figures 1, 2:
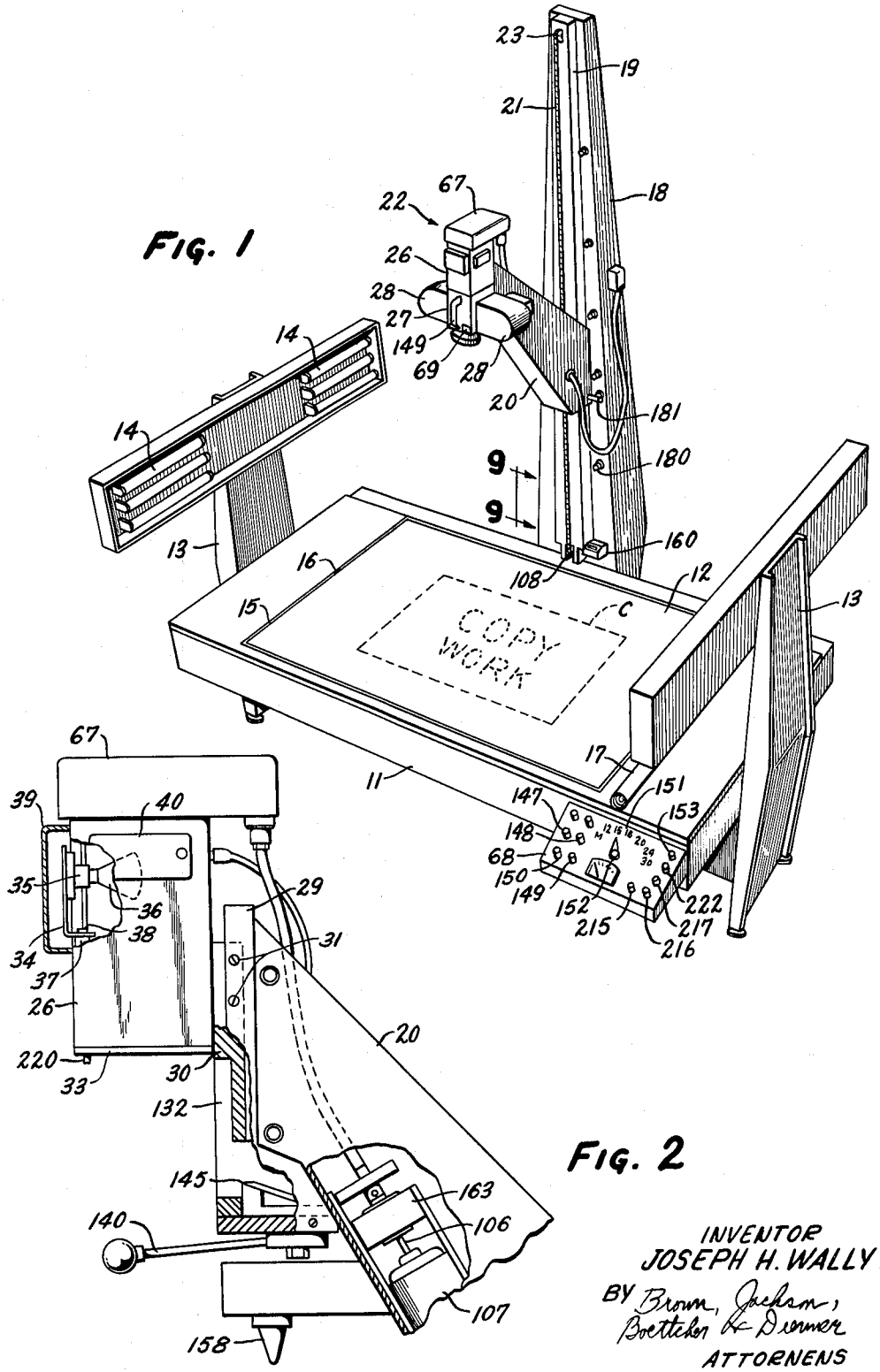
FIGURE 1 is a perspective view taken from the front righthand side of a photoreproduction device such as a camera-projector in which one form of the invention has been embodied.
FIGURE 2 is a fragmented view partly in section and shows the lamp housing with the automatic focus control mounted on the end of a supporting arm which contains the motor and brake for driving said focus control.

Although the invention may be embodied in a camera, projector or other device where it is important to be able to change the spacings of a pair of image planes and while obtaining proper focus of its objective lens, for convenience in understanding the invention, it will be described in connection with a camera-projector as illustrated by the accompanying views. Therefore, turning now more specifically to the several views in which like parts are identified by like reference numerals and first to FIGURE 1, a combined camera-projector for microfilm-photography is there illustrated as comprising an easel 11 having a translucent top surface 12, the easel 11 being of rectangular box shape and preferably containing fluorescent bulbs or other equivalent light means by which copy work C positioned on the translucent top 12 may be back-lighted. Easel 11 is preferably supported by end-located uprights 13 which also support fluorescent bulbs indicated generally at 14 and which are provided with suitable reflectors to top light the copy work C. Preferably top plate 12 has a continuous channel 15 spaced inwardly of its periphery to encircle the copy C and which communicates through openings 16 to a suitable vacuum pump (not shown). At 17 is a roll of flexible acetate sheet material which may be unrolled over the copy work and the top plate 12 including the channel 15 so as to hold the copy work flat when the vacuum pump is operated to evacuate air from beneath the acetate sheet via channel 15. Associated with easel 11 and secured to the rear thereof is a vertical column 18 having a vertical guide way 19 along which one end of supporting arm 20 slides to position the combined camera-projector head 22 at a selected height over the copy work to achieve a desired magnification or reduction of image size. For this purpose, support 20 and optical head 22 are connected to the ends of a chain 21 shown in FIGURE 1 as passing over upper sprocket 23 and driven by gear 24 at the lower end of its flight, gear 24 being mounted on shaft 25 of a gear-reduction unit 31a driven by a reversible electric motor 31 contained in the base of the column 18.

Optical head 22 comprises two separable parts, a lamp housing 26 which is permanently attached to the forward end of supporting arm 20 as hereinafter described, and an optical compartment 27 (FIGURE 3) which is removably assembled beneath the lamp housing 26 and has film storage compartments 28 fixed to either side thereof. The construction thereof and operating details of the film advancement means are fully described in my aforementioned copending application Serial No. 156,065.

Referring now to FIGURE 2, rigidly and permanently secured between flanges 29 on the forward end of arm 20 is a vertically extending plate 30, as by screws or other appropriate connecting means. Lamp housing 26 is connected to the upper end of said plate 30 as by screws 32, although again, any other appropriate connection means may be used. Lamp housing 26 is provided with an opening in its bottom wall defined by a depending circular shaped flange 33 which seats in the open top of the chamber in the optical compartment 27 as will hereinafter be made clear. In the top of lamp housing 26 is a bracket 34 supporting socket 35 for a lamp 36. Bracket 34 is connected to a shelf-like portion 37 positioned to the forward side of the lamp housing 26, as by a threaded member 38. The opening in bracket 34 through which the stud portion of member 38 extends is purposely made larger than the diameter of said stud in order to permit alignment of the filament of bulb 36 essentially on the axis of the flanged opening 33. Removable covers are provided on the lamp housing at 39 and 40 through which access may be gained to the interior of housing 26 for replacement of the bulb and adjustment thereof to center its filament with respect to opening 33.

Turning now to FIGURE 3, optical compartment 27 comprises a unitary casting of aluminum or other machinable light metal having a cylindrically shaped chamber or bore therethrough which is precisely stepped to provide supporting ledges at 41, 42 and 43. Shelf 41 serves to receive the precisely dimensioned upper plate 44 which with plate 45 constitutes the film gate. It also supports a first condenser lens 46 of plano-convex shape to which the film gate members are cemented, the condenser lens having a flattened edge 47 paralleling its axis and which abuts a block 48 secured to the wall of housing 27 as by screws 49, said block having a complementary surface against which the flattened edge of lens 46 engages to resist its turning and precisely locating it. A spacer ring 51 rests on the edge of condenser lens 46, a portion thereof being cut out to provide clearance for block 48. Block 48 also serves to prevent turning of spacer 51. Spacer 51 serves as a seat for the peripheral edges of a second condenser lens 50 having its convex side facing the convex side of the first lens 46. The assembly of upper plate 44 and condenser lens 46, spacer 51 and condenser 50 is fixed by means of retainer ring 52 threadedly connected with the appropriately threaded inner wall of chamber 40. Ring 52 is also internally threaded and has a portion 53 which forms a seat against which the lip of cap 54 engages when threadedly connected within ring 53 to bar the passage of light from lamp 36 as when the optical head is to be used as a camera. For its convenient manipulation and turning of the cap 54, means such as handle 55 is provided.

Below ledge 41, ledge 42 provides an appropriate peripherally disposed shoulder supporting an iris shutter 56 of conventional construction. The optics of the system are completed by a pair of convexo-convex objective lenses 57, 58 cemented within an externally threaded sleeve 59 in proper axial spaced relation to each other. Sleeve 59 is threadedly mounted within an outer sleeve 60 which is supported in a fixed position on ledge 43 at the lower end of chamber 40 by means of its integral lip portion 61 and a retaining ring 62 which is threaded to an externally threaded upper end of sleeve 60 so as to be firmly clamped about projecting ledge 43. Appropriate means, such as a set screw threaded through the wall of housing 27 to engage in sleeve 60 will also be provided to prevent rotation of sleeve 60 during the rotation of sleeve 59 therein.

In the different spacings of the optical compartment relative to the easel to accommodate various magnifications or reductions of the image-projection, it is also important to sharpen the focus and maximize resolution by accurately spacing the objective lenses 58, 57, relative to the film. As seen in FIGURE 3, sleeve 59 is provided with a surrounding gear 63 whose teeth mesh with a pinion 64 fixed to the lower end of vertical shaft 65. Said shaft 65 extends upwardly through a provided opening in the casting which constitutes the optical compartment and releasably joins, as by a tongue 65a and kerf 66a connection (FIGURE 3) with the lower end of shaft 66 depending through the lamp housing, shaft 66 being rotated by means 67 as hereinafter described. A digital counter 69 is operatively connected with gear 63 through bevel gears 70a and 70b, the latter being mounted on a common shaft and gear 71 appropriately meshing with the teeth of gear 63. Digital counter 69 therefore permits a visual reading to be taken of the axial distance through which the objective lenses have been moved by rotation of shaft 65, 66 in response to means 67.

Figure 10:
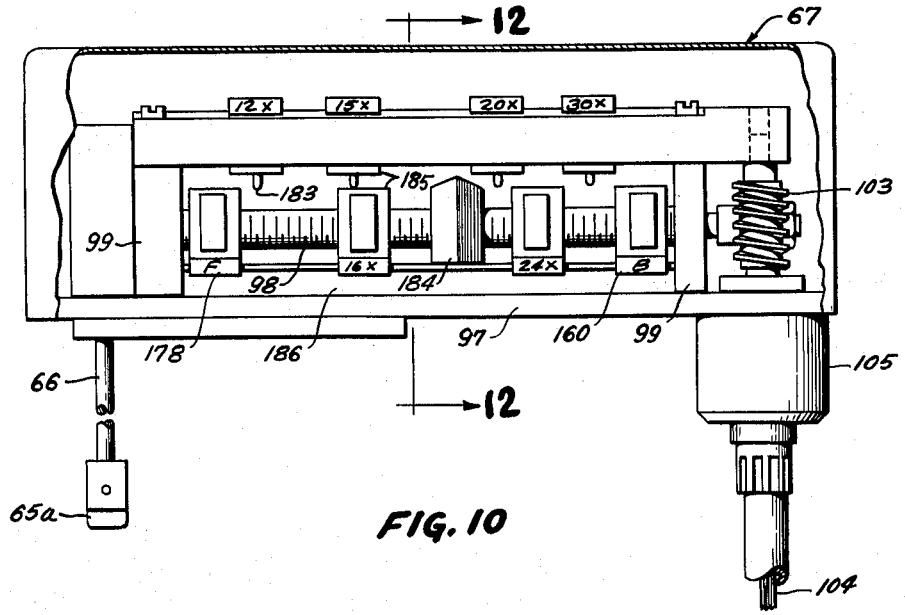
FIGURE 10 is an enlarged fragmented view of the automatic focus control assembly taken in side elevation.
Figure 11:
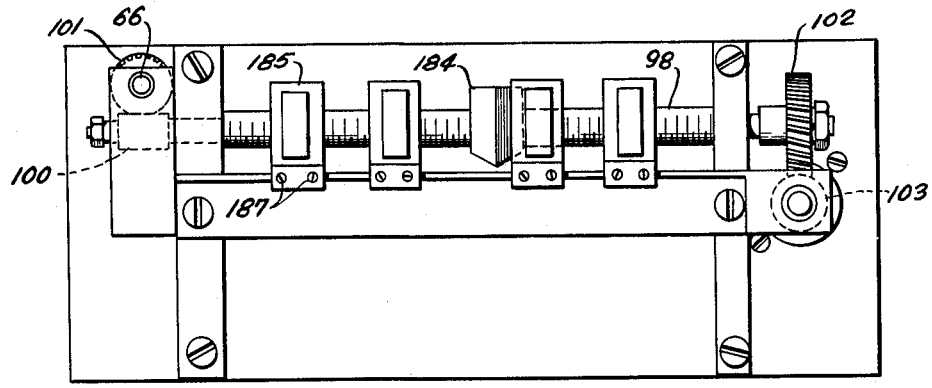
FIGURE 11 is a top plan view of said focus control assembly as viewed in FIGURE 10.
Figure 12:
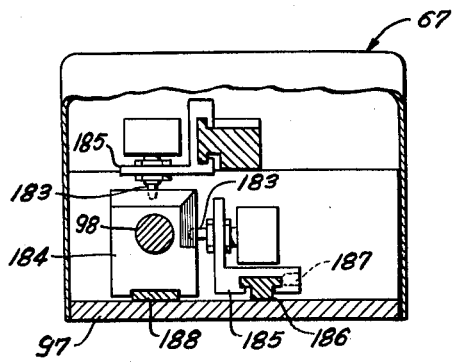
FIGURE 12 is a sectional view taken through said assembly along lines 12—12 of FIGURE 10.

Referring now to FIGURES 10, 11 and 12, said means 67 is seen to comprise a threaded shaft 98 rotatably supported in bearings 99 and having a worm 100 at its forward end, the teeth of which mesh with work gear 101 fixed to the upper end of shaft 66. On the rear end of screw lead 98 is a second work gear 102 the teeth of which mesh with a worm 103 fixed on the upper end of a flexible shaft 104, the latter being rotatably supported by mount 105 secured to the underside of the housing 97 atop lamp housing 26 (FIGURE 2) and enclosing the focusing control assembly 67. Flexible shaft 104 in turn is operatively connected to the arbor 106 of reversible focus motor 107. Therefore, in accordance with which direction focus motor 107 turns, the rotation of its arbor 106 will be transmitted through the described gear train to move the objective lenses 57, 58 in an axial direction toward or away from the film platen 80 thereby to permit accurate focusing of the objective on the film positioned at 80, as for example when the optical compartment is arranged as a camera, or conversely to focus an image of the film on the easel 11 when set up as a projector.

Focusing of the objective for the range of enlargement or reduction diameters to which the device may be set by raising or lowering the optical head 22 can be accomplished in accordance with the invention either "manually" or "automatically." Referring to FIGURES 1 and 13, panel 68 is seen to include an up elevator button 147, a down elevator button 148, a back focus button 149 and a forward focus or "automatic" button 150. Also at 151 is indicated a scale bearing the legend "M, 12X, 15X, 16X, 20X, 24X, 30X" and associated therewith is a selector 152. The legend "M" stands for manual operation and the other legends represent reduction or enlargement stops to which the camera projector may be automatically set as hereinafter described. Referring now to FIGURE 13, the electrical circuits controlled from panel 68 are shown connected to a suitable source of 115 volts A.C. by a pair of conductors 120 and 121, the connection being obtained through selector 152 which is actually a three pole switch connected to line 120 through the master control switch 153. The legends "M" through "30X" actually correspond to seven contact points of three decks identified as A, B and C in FIGURE 13. When it is desired to set the camera-projector for automatic focusing, the selector is moved to connect one contact in each of the three decks with line 120. For example, if one is operating the device as a camera and is interested in a 16X reduction, then he moves the selector 152 so that it aligns with the legend "16X" on the dial 151 as seen in FIGURE 1 which effectively locates selector 152 across the corresponding contacts of the three decks as is indicated by dotted lines a. As will hereinafter be explained, then by pressing on automatic button 150, motors 31 and 107 will automatically raise the optical head and the objective lenses 57, 58 to the positions which have been calibrated to provide such a reduction diameter size and one of good focus. On the other hand if the operator desires some other reduction diameter than those for which the device can be automatically set by selector 152, then he must accomplish this manually which he does by moving selector 152 to "M" which as shown by dotted line b in FIGURE 13 effectively connects the three contacts comprising the "M" position of decks A, B and C with line 120.

The manual elevation of the optical head and focus adjustment of the objective lenses will be first described. Referring therefore to FIGURE 13 and assuming selector 152 to be set in manual position, by closing the up elevator button 147, a circuit is completed from line 120, across switch 153, selector 152, line 154, through switch 147, and line 155 to the normally closed side of the elevator up-limit switch 156 to a relay circuit (not shown)

which operates the elevator motor 31 in one direction and thence to the other side of the A.C. supply via line 121. Therefore by pressing on button 147, the elevator motor 31 operates to move the optical head supporting arm 20 in an upward direction and until pressure on button 147 is released. Similarly, by pressing the down elevator button 148, a circuit is completed from line 154 via button 148 through line 157 to the normally closed side of the lower-limit switch 158 of the elevator switch, under which condition the armature and field windings of the elevator motor 31 are excited in reverse and so that the motor now turns in the opposite direction and the optical head continues downwardly until button 148 is released. Thus by depressing buttons 147 and 148 the optical head may be set for any selected enlargement of reduction diameter. The objective lenses may be then adjusted into proper focus by depressing either button 149 or 150. For example, by depressing the back focus button 149, this completes a circuit via line 154 through switch 149, line 159 to the normally closed side of the focus back-limit switch 160 which completes the circuit to the other end of the supply via line 161 through the relay circuits indicated generally at 162 when under this condition operate the focus motor 107 so that it turns the lens supporting gear 63 in a direction which raises the objectives 57, 58 toward the film platen 80 and until pressure on button 149 is released.

Connected across the motor circuit is a brake 163 which is so mechanically wired into the circuitry of the motor as may be seen from FIGURE 13 that on pressing button 149 to energize the focus motor 167 in back direction, condenser 164 is charged and which discharges as soon as the motor circuit is interrupted, energizing the brake 163 so as to mechanically lock motor arbor 106 against rotation. The effect is, of course, to minimize free running of the shaft after the focus motor 107 has been turned off and thus assures accurate location of the objective lens under the control of the stopping and starting of motor 104. Such instantaneous applying of the brake to stop the focus motor in its back position is particularly important in the automatic operation of the focus motor as will be later described. Referring again to FIGURE 13, the objective lens can also be moved away from the film platen 80 by depressing button 150 marked "Automatic." This completes a circuit from one side 120 of the A.C. supply through line 165, switch 150 line 166, to one side of trigger relay. Safety switch 220 (FIGURE 2) coupled to the open side of contact 169 being closed on assembly of the optical compartment 27 with lamp housing 26 as herein described completes a circuit through line 168, control switch 169, line 171 and normally closed switch 172 to supply line 121. Relay 167 therefore closes contact switch 174 so as to complete a circuit from supply line 120 via line 175 through the now closed side of switch 174, line 176 to the normally closed side of the forward limit switch of the focus motor 107 which energize motor relays 16 but so that focus motor 107 now turns to drive the objective down and away from the film plate 80 and which continues until the operator releases button 150. Under this condition of energizing focus motor 107, capacitor 164 does not discharge to set brake 163 when the automatic button is released. As thus described this represents the manual operation of the device and by which it is possible to set and focus the device for any desired reduction and/or enlargement diameters of the projected image.

Figure 9:
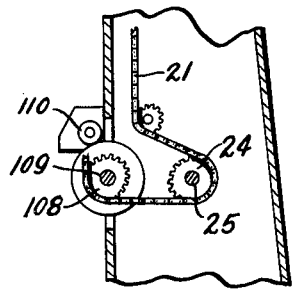
FIGURE 9 is a sectional view taken along lines 9—9 in FIGURE 1 and illustrates one arrangement for operating the digital counter which checks the height of the film holder or platen from the easel.

As previously mentioned, the operator by watching digital counter 69 can determine the setting of the objective lenses as he presses focus motor buttons 149 and 150 and by comparing his reading with a previously prepared chart determines when the objective is in proper focus for a particular setting of reduction or enlargement diameter. This latter setting may also be read off a second digital counter 160 conveniently located at the base of column 18. Referring to FIGURE 9, it will be seen that chain 21 driven by elevator motor 31 is engaged by the teeth of an idler gear 108 so as to be turned by chain 21 and in the direction in which it is driven. Gear 108 is mounted at one end of a shaft 109 rotatably journaled in appropriate supports having a large gear on its opposite end, the teeth of which mesh with a small pinion gear 110 on the shaft of digital counter 107.

As previous indicated, the projector-camera may also be set to automatically obtain one of a limited number of enlargement or reduction diameters. As already described for purposes of illustration these have been considered to comprise six in number and are selected by moving selector 152 to the marked position on dial 151 which corresponds to the elected automatic setting. In the example, a setting of 16 diameters has been considered and selector 152 is shown in FIGURE 13 by dotted line $a$ as moved to this position. Referring therefore to FIGURE 13, it will be seen that each of the contacts of the C-deck lead are connected by an appropriate lead 179 to one side of a switch 180. These are toggle switches located along one side of column 20 (FIGURE 1) so as to be tripped by a traveler pin 181 fixed on optical head supporting arm 20. Thus it will be apparent that as the elevating motor operates to raise or lower the optical head, follower 181 effectively scans switches 180 and successively closes each switch as it passes thereacross.

Each of said stop switches 180 is located at a height to locate the film platen 80 at a distance from the easel surface 12 to afford a specific selected diameter of image reduction or enlargement when arm 20 has tripper 181 aligned therewith.

Figure 8:
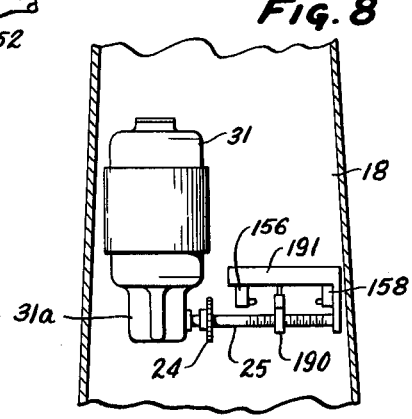
FIGURE 8 is a fragmented vertical sectional view taken through the supporting column 18 in FIGURE 1 to show the elevating motor and drive mechanism for raising and lowering the optical head supporting arm including the upper and lower limit switches.

Referring to FIGURE 8, the elevator up limit switch 156 and down limit switch 158 are seen located to be tripped by a traveler 190 threadedly connected on a threaded extension 21b of elevator motor shaft 31a, traveler 190 being keyed into member 191 so that it is prevented from turning with rotation of motor 31 and instead moves back and forth between limit switches 156 and 158 depending on the direction in which elevating motor 31 is turned.

Turning again to FIGURE 13, the contacts of the A-deck also connect by appropriate leads 182 to a respective one of focus stop switches 183. Referring now to FIGURES 10, 11 and 12 it will be seen that switches 183 are also of the toggle type and selectively closed on engagement by a traveler 184, which is keyed to a slideway 188 and is driven by reason of its threaded connection on screw lead 98 previously described as rotated by focus motor 107. Toggle switches 183 are mounted in two banks, one above and one to the side of traveler 184, each toggle switch being mounted on one arm of an L-shaped support 185, the other arm of which is keyed to a guide rail 186 or a guide rail 187 and locked thereto by a set screw 187. The thus described construction permits exceedingly accurate location of the several switches 183.

Referring now to FIGURE 10, the first switch will be seen to be identified in order, from left to right, as the focus motor forward limit switch 178, the 16X switch, the 24X switch and the focus motor back-limit switch 160. These are all mounted on guide rail 186. On guide rail 187 are mounted switches 183 corresponding to focus positions 12X, 15X, 20X and 30X. It will be appreciated that for physical reasons it is preferable to so divide the switches, although depending on the number of switches and the dimensions of supports 185 they could be arranged along a common guide. In any event, it will be understood that toggle switches 183 correspond to positions to which the focus motor drives the objective lenses and so as to locate the objective lenses for proper focus at the various heights to which the film platen is set by stopping tripping pin 181 of the optical head in alignment with one of reduction stop switches 180 on column 18. Furthermore, it will be appreciated also that as screw lead 98 is turned to effect rotation of shaft 66 to axially adjust the focus of objective lenses 57, 58 it also effectively moves the traveler 184 back and forth between the switches 183 so as to effectively scan and close each switch as it engages and passes the same.

Referring again to FIGURE 13, where selector 152 is moved into one of the automatic positions, as for example position 16X as indicated at *a*, switches 147, 148 and 149 are no longer connected to supply line 120 and therefore are ineffective to actuate the elevator motor 31 in either direction or the focus motor 31 in its back direction. However, as preveiously mentioned, automatic switch 150 remains connected to line 120 through its lead 165. Furthermore, it will be seen supply line 120 is connected through each of the contacts of deck B to common line 200 which connected with the trigger relay at 201 so that the various double acting switches and their controlling relays become energized on the operator's closing of switch 150. The sequence of operation which may be traced through the circuitry illustrated by FIGURE 13 is as follows: On depressing button 150, relay 167 is momentarily energized through go relay 202 which resets switch 203 so that current is now fed to start the focus motor in its forward direction as obtained through the normally closed side of the forward limit switch 178 as previously described, in which case a circuit is completed which starts the focus motor to move the objective in a downward direction until traveler 184 engages and thereby reacts forward limit switch 178. Under these conditions, switches 183, although closed by traveler 184 as it moves thereacross does not interrupt the focus motor 107. At the same time the go relay 204 in the elevator circuit is energized setting elevator down switch 205 so that a circuit is completed through line 206 to line 156 to the down elevator limit switch 158 starting the elevator motor to move the optical head downward until traveler 181 (FIGURE 1) engages limit switch 158 and resetting it to stop motor 31. Under these conditions, again although tripper 181 (FIGURE 1) activates switches 180, they do not affect the motor circuit. At the same time the two microfared capacitor 207 in the trigger relay 208 for the focus motor is being charged as is also a similar capacitor 209 in the elevator up trigger relay 210. Consequently when traveler 184 resets the focus motor forward limit switch 178 and traveler 190 resets the elevator motor down limit switch 158, their previously energized respective go relays 202 and 204 are pulled out and capacitors 207 and 209 discharge current into the go relays 211 for the reverse operation of focus motor 107 and go relay 212 for the reverse operation of elevator 31. Therefore the go focus back switch 213 is reset allowing current to flow via line 214 through the closed side of the back limit switch 160 of the focus motor 107. Focus motor 107 is now energized in reverse and as it brings the objective lenses toward the film platen, it again causes traveler 184 to close the focus stop switches 183 until it finds one (in the example, 16X) which is connected through a line 182, a contact of B deck and selector 152 to supply line 120. When this occurs, focus back relay 215 is energized to stop further operation of focus motor 107 and energizing brake 163 so as to reduce the overrun of the motor arbor to a minimum. In this position the objective lenses 57, 58 are properly located for image focus at the 16X setting of the film platen 80 relative to the easel 12. At the same time, a similar sequence is occurring in the elevator motor relays controls. Thus capacitor 209 discharges current into the elevator up go relay 216 resetting contactor switch 217 and permitting current to flow through line 218 to line 155 through the closed side of the elevator up limit switch 156 starting the elevator motor 31 to drive the optical head back up and away from the easel. This time as tripper 191 (FIGURE 1) on optical head supporting arm 20 engages toggle switches 180, it stops when it closes a switch 180 connected through lines 177 to the contact in deck C which is connected by selector 152 to supply line 120. It will be appreciated that in this instance, the setting of the optical head to obtain a particular enlargement or reduction of image diameter is less critical. Furthermore the motor is acting in an upward direction, so that when the motor stops, the weight of the optical head itself acts as a brake to inhibit further advance. It will be understood also that as the circuits are completed through stop switches 180 and 183 not only are the respective elevator motor 31 and focus motor 107 stopped but also all the control relays and contactors are reset to their starting positions as illustrated in FIGURE 13.

Thus, as described, in obtaining a selected setting for focus and enlargement or reduction image diameter, it is a characteristic of the described circuitry that the stop switches 180 and 183 are approached always from the same direction, that is the motor first moves the respective travelers past the lower setting and only on their reverse path do the travelers find an activated switch to stop the respective motors. Moreover the operations of the two motors although under the control of coupled circuitry operate independently. This is important because of the different lengths of travel which each must move its traveler in seeking the set position of stopping and more often than not one will have found its particular setting and stopped before the other. It will be appreciated that the circuitry illustrated by FIGURE 13 is merely one of several arrangements by which the optical head 22 and objective lenses 57, 58 therein may find a preset level to accommodate a particular reduction or enlargement of image diameter and one in proper focus. For example, in addition to other possible arrangements of relays and switches to operate motors 31 and 107, tripper 181 might be replaced by a small light bulb and switches 180 constitute photo cells including appropriate circuitry to stop motor 31 when a selected photo cell is impinged by light rays from such a bulb in the elevation of arm 20 along column 18. Also plural motors might replace the single reversible motors.

Figure 6:
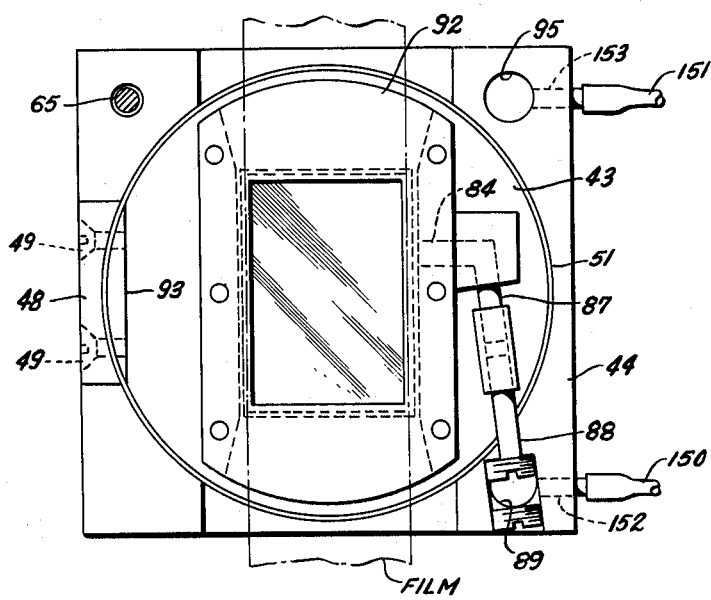
FIGURE 6 is a cross-sectional view taken along lines 6—6 of FIGURE 3 to show details of the film gate.
Figure 7:
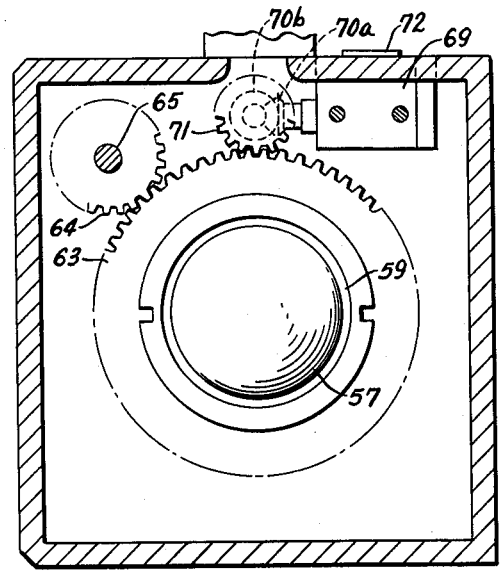
FIGURE 7 is a further cross-sectional view taken along lines 7—7 of FIGURE 3.

In the above described arrangement for obtaining focus control, as well as setting of the optical head and more particularly the film at selected heights for a given reduction or enlargement diameters, the assumption is made that the film is also accurately located. In accordance with the invention precise location of the film is obtained by a novel construction of film platen and holddown assembly. Referring therefore to FIGURE 3, a film platen 80 is illustrated as comprising a rectangular piece 81 of clear transparent glass preferably of the same quality and optical characteristics as the condenser lens 46. Preferably it also has flat parallel opposed surfaces although its film contacting surface 80 may be curved. Piece 81 is preferably cemented to the plane side of the condenser lens 46 with adhesives such as are well known to those skilled in the art, or it may be fused thereto or formed as an integral part of the condenser lens in the initial fabrication or grinding of condenser lens 46. Frame 44 of the film gate has the same outer configuration as condenser lens 46 to which it is preferably also cemented and has a central opening to receive platen piece 81. This opening is slightly larger than the width and length of piece 81 to leave a continuous channel 82 about platen 80 of which one wall is constituted by the adjacent plano surface of the condenser lens 46. Frame 44 also has a thickness essentially the same as or only slightly greater than piece 81 and a more restricted opening 83 about the periphery of the platen 80. Communicating with channel 82 is a bore 84 which communicates with the bore 85 of a depending block 86 through which tubing 87 (FIGURE 6) may be extended. Tubing 87 is appropriately connected by further tubing 88 into vertical bore 89 of the optical compartment which is connected to an air evacuating device not shown. To the underside of plate 44 is a second plate or frame 45 connected thereto as by screws 90. Said second frame 45 includes a continuous lip portion over restricted entrance 83 of channel 82 in spaced relation thereto. At their opposite ends plates 44 and 45 are appropriately shaped to form a film slot therethrough having communicating apertures at 92, the film being designated at F in FIGURE 6. Preferably the side walls of apertures 92 are flared outwardly in diverging relation and the end surfaces 94 of plate 45 are slightly beveled to provide ease in threading the film therethrough. As earlier mentioned, said portion 44 is shaped to the peripheral shape of condenser lens 96, and has a flattened portion at 93 corresponding to portion 47 of the condenser lens which also abuts block 48. Block 48 thus limits the position in which condenser lens 46 can be located and so properly aligns the film apertures 92 in the ends of frames 44, 45 with the openings in the opposite sides of the optical compartment which provides access from the film compartments 28 into the film gate for the film threading operation.

Shutter 56 is also connected with vacuum control operating mechanism through suitable tubing to a vertical port 95 in the optical compartment 27 which also is connected to the mentioned air-evacuating means. Desirably, the means operating the shutter and the drawing down of the film to conform to platen surface 80 of piece 81 may be controlled by a single button 222 on the panel 68, a short delay being enforced between the initial application of the vacuum to the channel 82 before shutter 56 opens. This provides for the positive conforming of the film against the platen surface 80 before exposure. In any event, it will be understood that vacuumizing of channel 82 must be intermittent in the sense that it is essential to release the vacuum each time the film is to be advanced, and this may be arranged to occur automatically as, for example, is described and claimed in my copending application Serial No. 241,848, filed December 3, 1962.

As previously pointed out, although the lamp housing 26 is attached to the supporting arm 20 as a permanent part of the apparatus, the optical compartment 27 and its associated film holding compartments 28 are adapted to be removed from the lamp housing 26 as a unit and to be subsequently assembled therewith quickly and conveniently. One advantage of such an arrangement is that the optical compartment with an exposed film may be separated from the apparatus and removed to the dark room for removal of the film and/or reloading. The optical compartment with the loaded film may be then reassembled with the lamp housing to continue the camera funtion. The ready separability of the optical compartment from the lamp housing also is necessary to permit the insertion or removal of cap 54 as in conversion of the apparatus from a camera to a projector, or reverse.

To accomplish ready assembly and disconnection of the optical compartment with the lamp housing, plate 30 which depends from the rear side of the lamp housing 26 serves first, as a guide against which the optical compartment may be positioned. It is also provided with a vertical keyway 131 of dovetail shape into which plate 130 seats. Plate 130 as seen in FIGURE 4 is connected by screws to the rear side of supporting plate 129 attached to the optical compartment 27 and has converging side edges 132 which complement the dovetail sides of recess 131. Secured to the lower end of plate 30 as by screws 133 is a cam-supporting plate 134 apertured at 135 to receive a depending projection 136 of cam member 137. Member 137 is also shouldered at 139 about projection member 136 to permit its relatively free movement over the top surface of supporting plate 134 as when rotated by operating arm 140 which is welded or otherwise formed integrally with washer member 141, the latter being connected to projection 136 as by a locking screw 142. Plate 130 has a catch portion 143 which projects through a provided opening in plate 30 so as to rest on the surface 145 of cam member 137. Opening 144 is made slightly larger then the vertical dimensions of catch 143 as vertical recess 131 is similarly made slightly longer in its vertical dimension than plate 130 to allow a limited vertical sliding movement of the optical compartment along plate 30 when its plate 130 is assembled in recess 131 and its catch portion is extended through opening 144 and over cam surface 145. This allows for convenient movement of the optical compartment upwardly toward the bottom wall of the lamp housing 26 to receive the depending flange portion 33 of the lamp housing 26 within the provided opening in ring 52 of the optical compartment to the position as seen in FIGURE 3, thus assuring alignment of its optical components with the filament of the lamp 36. This can be conveniently obtained by grasping the compartment 27, pushing the catch through opening 144 and sliding the compartment guided by plate 130 in recess 131. The compartment may be then locked in position by rotating arm 140 which effectively operates cam 145 to bring a higher portion thereof under said catch and thereby tightly wedge the top edge of the compartment against the underside of the lamp housing 26. By rotating the arm 140 in a reverse direction, the optical compartment will drop down out of its interfitting relation with flange 33, permitting catch 143 to be withdrawn through opening 140.

In the above description, it will be apparent that operation of the apparatus whether used as a camera to photograph copy positioned on the easel or as a projector to project an image from sensitized film can be easily and conveniently accomplished. Assuming the apparatus is to be used as a camera the optical compartment is carried to the dark room where film is loaded into film compartments 28 and threaded across platen 80. During this period, with the optical compartment 27 removed from the lamp housing 26 button 220 (FIGURE 2) is in open position and so prevents operation of the automatic focus button be the device set in manual or for an automatic focus position. This guards against accidental touching of the button 150 while the optical compartment is removed and therefore destroying the value of the digital counter readings. At the same time the elevator up and down buttons 147, 148 remain energized (assuming the selector 152 to be set on manual) so that it is still possible to operate the elevator to raise or lower the optical head as in the loading or unloading operation.

After the film has been properly loaded into the optical compartment, it is removed from the dark room and positioned beneath the lamp housing 26 by locating its flange 33 in the top opening of the compartment 27, being sure to mate tongue 65a of shaft 65 with the slot in the end of shaft 66. The compartment is then locked in place by rotating arm 140. In said act of assembling the optical compartment beneath the lamp housing, a solid portion of the optical compartment top wall engages safety switch 220 to reclose the circuit controlled by automatic button 150.

Once air hoses 150 and 151 have been plugged into their respective ports 153, 153 on the sides of compartment 27 and the necessary electrical connections reestablished the device is ready for operation as a camera. It will be understood that the electrical connection as well as the air-evacuating hose connections can be so designed as to automatically locate themselves when the optical compartment is moved into position and locked. With the optical compartment in place, copy work can be covered by the acetate 17 and vacuum applied to hold the copy flat and the camera moved into position for the reduction size demanded. This can be obtained manually or automatically. If it is to be obtained manually selector 152 is set to M on dial 151. The elevator up and down buttons 147 and 148 may be then pressed to locate the optical head at the proper height which may be read off digital counter 160. Focus buttons 149 and 150 are also operated to bring the objective lens into proper focus for the particular setting and which will be determined by taking a visual check of the digital counter 69. On the other hand, if the focus and reduction setting is one of the precalibrated stops, then by moving selector 152 to the proper reduction setting, the operator need merely depress automatic button 150 whereupon the elevator will be raised to the proper height and the objective lens will be adjusted to the proper distance from the film for proper focus on the copy at said height. Thereafter, having measured the light intensity on the copy work and adjusting the back as well as top lighting of the copy work through buttons 215 and 216 which control the top and back lighting respectively, button 217 may be then pressed to air-evacuate channel 82 which effectively draws the film against the platen surface and momentarily opens shutter 57 to expose the thus held film to light entering objective lenses from the copy work. The film is then advanced one frame and after any necessary changes in reduction and focus setting made, the device is ready for the next exposure.

If the apparatus is to be operated as a projector it will be unnecessary to load the film in a dark room. Also cap 45 will need to be removed from behind the condenser lenses in order that light from lamp 36 may be directed downwardly through the condenser lenses 46-50 and film positioned on the front side thereof to project an image of the film to the easel 12 below which now serves as a viewing screen or printing easel. Again the same adjustments as far as focus will be made.

Thus as described it will be apparent that all of the recited advantages, features and objects of the invention have been demonstrated as obtainable in a completely practical and highly efficient manner.

Therefore having described my invention, I claim:

1. In a camera or projector, an easel, an upright on which is slidably supported an optical head, said optical head including a film support and an objective, said film support and easel defining a pair of image planes between which the objective is aligned to direct image-forming light rays from one to the other image plane, a first set of vertically spaced switches along said upright, the optical head having means which engage said switches as it slides along the upright, and a reversible motor to slide said optical head on said upright toward and away from the easel in accordance with the direction in which the motor is turned, said optical head including a second reversible motor, and drive means operated by said second motor to move the objective toward and away from the film support in accordance with the direction in which said second motor turns, said drive means including a traveling member and a second set of switches associated therewith to be engaged as the traveler moves with movement of the objective, means for activating one of the switches in each set, said switches of the two sets when activated and engaged by the optical head and traveling member stopping the respective motors by which they are driven, the switches of the first set thereby serving to accommodate selection of one of a series of image magnification-reduction ratios to which the camera or projector may be set, and means for coupling the switches of said two sets such that the switches of the second set serve to locate the objective for optimum focus at the image magnification-reduction ratio for which the camera or projector has been set by means of the first set.

2. In a camera or projector, an easel, an upright on which is slidably supported an optical head, said optical head including a film support and an objective, said film support and easel defining a pair of image planes between which the objective is aligned to direct image-forming light rays from one to the other image plane, a first set of vertically spaced switches along said upright, the optical head having means which engage said switches as it slides along the upright, and a reversible motor to move said optical head on said upright toward and away from the easel in accordance with the direction in which the motor is turned, said optical head including a second reversible motor, and drive means operated by said second motor to move the objective toward and away from the film support in accordance with the direction in which said second motor turns, said drive means including a traveling member and a second set of switches associated therewith to be engaged as the traveler moves with movement of the objective, means for initially energizing said motors in a direction to move the optical head and the objective to their maximum down positions, and then to reverse themselves, means for activating one of the switches in each set so as to stop the respective motors by which they are driven only when engaged by the optical head and traveling member in their reverse direction of turning of said motors, the switches of the first set thereby serving to accommodate selection of one of a series of image magnification-reduction ratios to which the camera or projector may be set, and means for coupling the switches of said two sets such that the switches of the second set serve to locate the objective for optimum focus at the image magnification-reduction ratio for which the camera or projector has been set by means of the first set.

3. The combination of claim 2 wherein means are provided which may be actuated to accommodate independent operation of the motors.

4. The combination of claim 2 wherein the camera or projector also has means which may be actuated to permit operation of either motor independently of the other, and each of said motors further drives digital counter means from which a reading may be had of the related heights of the objective and optical head.

References Cited by the Examiner
UNITED STATES PATENTS 3,052,156  9/1962  Blatherwick _____ 88—24

NORTON ANSHER, *Primary Examiner.*

EVON C. BLUNK, *Examiner.*

RICHARD A. WINTERCORN, *Assistant Examiner.*